Figure 1:
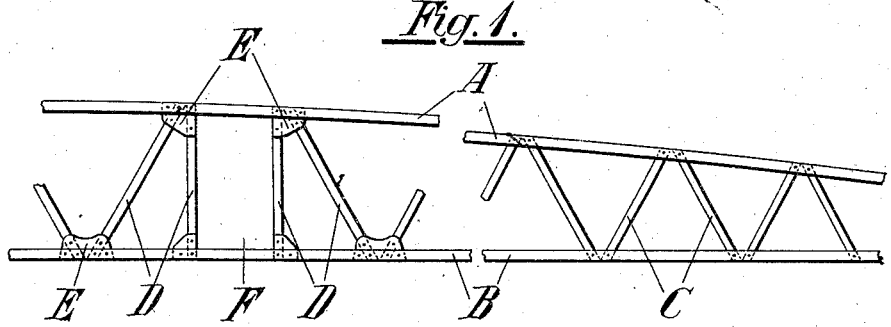
Figure 2:
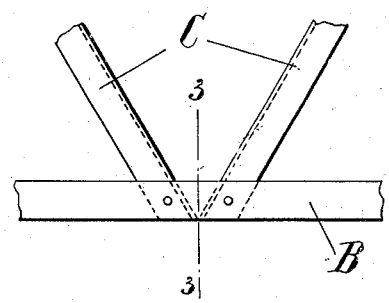
Figure 3:
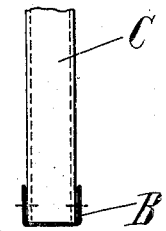
Figure 4:
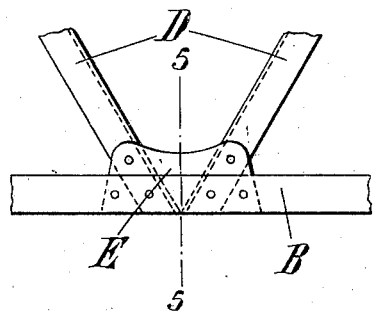
Figure 5:
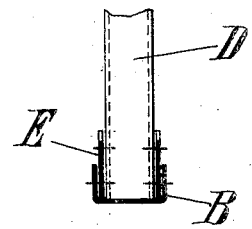

Feb. 10, 1925.

K. ARNSTEIN

AIRCRAFT STRUCTURE

Filed Jan. 6, 1921

INVENTOR:
Karl Arnstein

Patented Feb. 10, 1925.

1,526,198

UNITED STATES PATENT OFFICE.

KARL ARNSTEIN, OF FRIEDRICHSHAFEN, GERMANY, ASSIGNOR TO THE FIRM: LUFT-SCHIFFBAU ZEPPELIN GESELLSCHAFT MIT BESCHRANKTER HAFTUNG, OF FRIED-RICHSHAFEN, GERMANY.

AIRCRAFT STRUCTURE.

(GRANTED UNLER THE PROVISIONS OF THE ACT OF MARCH 3, 1921, 41 STAT. L., 1313.)

Application filed January 6, 1921. Serial No. 435,501.

*To all whom it may concern:*

Be it known that I, KARL ARNSTEIN, a citizen of the Czechoslovak Republic, residing at Friedrichshafen, Germany, have invented certain new and useful Improvements in Aircraft Structures, of which the following is a specification.

My invention refers to aircraft structures and more especially to metal ribs for the supporting planes of flying-machines and similar flat girder-like components for light construction. Its particular object is to combine great lightness and strength, more especially in regard to buckling strains, in the finished structure.

Lightness is achieved by employing thin-walled open sections of light metal, these sections being preferably drawn from band metal. In themselves such sections are not capable of much resistance against torsion and compression, owing to their possessing no reinforced corners or edges respectively, such as are found in the well-known channel irons for instance. The desired capacity of resisting buckling strains is, however, obtained by mounting the boom and the strut relative of one another in a manner that is particularly capable of withstanding torsional strains.

To this end thin-walled struts of section are inserted in booms of similar kind and fastened to the flanges of the boom by riveting. The fact of the flanges of the boom and strut overlapping one another ensures the riveting being very reliable. The strength of this joint is further enhanced by the strut, even though still unriveted, already being guided on two sides in the boom without any torsion relative of one another being possible. If gusset plates are employed these may, in further development of my invention, be inserted between the strut and the boom which, for this purpose, are chosen slightly wider than ordinarily, thus allowing of directly riveting the gussets to the struts on their outside and to the booms on their inside without any bending or addition of packing pieces being required. As the boom sections grip the ends of the strut sections in the manner of a socket the gussets can be made lighter than if the struts were to end above the flanges of the boom instead of reaching into the boom section. It is due to this socket-like relative guiding of the strut and boom that the gussets are subjected to insignificant strains only and of all things are not liable to any danger of buckling at the joint.

In the drawings affixed to this specification and forming part thereof, a rib embodying my invention is illustrated by way of example. In the drawings—

Fig. 1 is a longitudinal view of the middle part of the rib of a supporting plane, whilst Figs. 2 to 5 are a view and a section each of two details of Fig. 1 on an enlarged scale.

The metal rib consists of an upper boom A, a lower boom B, and struts C and D of U-shaped thin-walled sections drawn from metal bands for instance. The struts C arranged in the back part of the rib fit accurately into the booms A and B. The struts D situated more towards the front end of the rib are somewhat lighter and are separated from the flanges of the booms by a thin gusset plate E inserted between the two. In both cases, however, the struts reach into the booms until they touch the inner surface of the web of the boom. Consequently the flanges of the booms and struts overlap one another and are either riveted together directly or through the gusset plates E.

Fig. 1 shows that it is perfectly easy to connect several struts with one point of the boom, as may be desired for instance for producing the guidance F of a cross-beam. As there is no free space between the boom and the strut and as the gusset plate lies against the flange of the boom on the one side and against the flange of the strut on the other side, there is no need to crank the gusset plate nor is the latter subjected to bending or buckling strains. This method of construction shows itself to be advantageous not only when used for the metal ribs of supporting planes of flying-machines, but in all flat girder-like components for light construction, the cross-sections of which are characterized by having a large height in combination with small breadth.

I claim:

1. Metal rib for aircraft comprising in combination, thin-walled channel booms, thin-walled channel struts of a width approximately equalling the width of said booms having their end inserted in said channel booms and rivets traversing the contacting flanges of said booms and struts.

2. Metal rib for aircraft comprising in combination, thin-walled channel booms, thin-walled channel struts of a width approximately equalling the width of said booms having their end inserted in said channel booms, gusset plates inserted on either side between said struts and said booms and rivets traversing the flanges of said booms and struts and said gusset plates.

In testimony whereof I affix my signature.

KARL ARNSTEIN.